United States Patent
Ueda et al.

(10) Patent No.: US 8,082,259 B2
(45) Date of Patent: Dec. 20, 2011

(54) INFORMATION PROCESSING APPARATUS FOR EXTRACTING OBJECTS

(75) Inventors: Michiyoshi Ueda, Tokyo (JP); Takeshi Fujita, Tokyo (JP); Tsutomu Kawachi, Tokyo (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 11/908,557

(22) PCT Filed: Mar. 16, 2005

(86) PCT No.: PCT/JP2005/004644
§ 371 (c)(1),
(2), (4) Date: Aug. 6, 2009

(87) PCT Pub. No.: WO2006/098018
PCT Pub. Date: Sep. 21, 2006

(65) Prior Publication Data
US 2009/0300058 A1    Dec. 3, 2009

(51) Int. Cl.
*G06F 17/30* (2006.01)
*G06F 7/00* (2006.01)

(52) U.S. Cl. ......... 707/755; 707/769; 707/812; 707/955

(58) Field of Classification Search .................. None
See application file for complete search history.

(56) References Cited

U.S. PATENT DOCUMENTS

| | | | |
|---|---|---|---|
| 5,875,441 A * | 2/1999 | Nakatsuyama | 1/1 |
| 5,913,214 A * | 6/1999 | Madnick et al. | 1/1 |
| 5,956,726 A * | 9/1999 | Aoyama et al. | 707/755 |
| 5,961,591 A * | 10/1999 | Jones et al. | 709/217 |
| 5,983,268 A * | 11/1999 | Freivald et al. | 709/218 |
| 6,012,087 A * | 1/2000 | Freivald et al. | 709/218 |
| 6,311,223 B1 * | 10/2001 | Bodin et al. | 709/247 |
| 6,347,320 B1 * | 2/2002 | Christensen et al. | 1/1 |
| 6,408,297 B1 * | 6/2002 | Ohashi | 1/1 |
| 6,502,112 B1 * | 12/2002 | Baisley | 715/210 |
| 6,519,557 B1 * | 2/2003 | Emens et al. | 704/8 |
| 6,526,410 B1 * | 2/2003 | Aoyama et al. | 1/1 |
| 6,826,553 B1 * | 11/2004 | DaCosta et al. | 1/1 |
| 6,920,609 B1 * | 7/2005 | Manber et al. | 715/205 |
| 7,174,506 B1 * | 2/2007 | Dunsmoir et al. | 715/207 |
| 7,519,621 B2 * | 4/2009 | Harik | 1/1 |
| 2004/0249824 A1 * | 12/2004 | Brockway et al. | 707/100 |
| 2005/0038785 A1 * | 2/2005 | Agrawal et al. | 707/6 |

FOREIGN PATENT DOCUMENTS

| | | |
|---|---|---|
| JP | 11-250054 | 9/1999 |
| JP | 2003-177993 | 6/2003 |
| JP | 2004-303097 | 10/2004 |
| JP | 2000-155756 | 6/2006 |

* cited by examiner

*Primary Examiner* — Greta Robinson
*Assistant Examiner* — James J Wilcox
(74) *Attorney, Agent, or Firm* — K&L Gates LLP

(57) ABSTRACT

An object of the present invention is enabling extraction of objects from a predetermined Web page and linked Web pages led by hyperlinks of the Web page without inputting Web page identifiers corresponding to the linked Web pages. In order to achieve this object, processing means specifies a portion sandwiched by an object start identifier and an object end identifier from display control information and extracts a Web page identifier of a linked Web page from the specified portion based on an extracted portion identifier (S25). The processing means extracts a portion as an object that is sandwiched by an object start identifier and an object end identifier and that satisfies a search condition accepted from input means from display control information of the Web page corresponding to the extracted Web page identifier and stores the portion in storage means (S35).

4 Claims, 5 Drawing Sheets

FIG. 3

STANDARD OBJECT DATABASE

| OBJECT START IDENTIFIER | OBJECT END IDENTIFIER |
|---|---|
| <a | </a> |
| <table | </table> |
| <img | > |
| <applet | > |
| <embed | > |
| ⋮ | ⋮ |

WEB PAGE IDENTIFIER EXTRACTING CONDITION DATABASE

| OBJECT START IDENTIFIER | OBJECT END IDENTIFIER | EXTRACTED PORTION IDENTIFIER |
|---|---|---|
| <a | </a> | src= |

112

HTML FILE (DISPLAY CONTROL INFORMATION)

FIG. 8

HTML FILE OF LINKED WEB PAGE

```
<html>
<head>
<title>SUB-PAGE1</title>
</head>
<body>
```
801 — `<img src="picture2.gif">`

```
</body>
</html>
```

| `<img src="picture1.gif">` |
| `<img src="picture2.gif">` |

INFORMATION PROCESSING APPARATUS FOR EXTRACTING OBJECTS

TECHNICAL FIELD

The present invention relates to a technique of extracting objects from existing Web pages and reusing the objects.

BACKGROUND ART

Conventionally, inventions of a Web generating apparatus or the like to extract objects, such as figures and tables, from existing Web pages and generate a new Web page have been disclosed (e.g., see Patent Document 1).

The Web generating apparatus includes a Web page generating unit to extract objects from a plurality of Web pages and generate a new Web page in a free layout, a repository management unit to store configuration information of the generated Web page and update pasted objects, and a Web page executing unit to actually generate a Web page by using the configuration information and objects stored in the repository management unit.

With this configuration, objects can be extracted from specified existing Web pages, and a new Web page can be generated by placing the extracted objects in a free layout.

However, in the above-described conventional art, when objects are to be extracted from a predetermined Web page and linked Web pages led by hyperlinks of the Web page, each of Web page identifiers corresponding to the linked Web pages needs to be input.

Patent Document 1: Japanese Unexamined Patent Application Publication No. 11-250054

DISCLOSURE OF INVENTION

Problems to be Solved by the Invention

An object of the present invention is to reduce inconvenience of the above-described conventional art and enable extraction of objects from a predetermined Web page and linked Web pages led by hyperlinks of the Web page without inputting Web page identifiers corresponding to the linked Web pages.

Means for Solving the Problems

In order to achieve the above-described object, the present invention adopts the following configuration.

The invention described in Claim 1 is an object cutter program used in a terminal apparatus including information storage means, information input means, communication means for communicating with an information providing system, and processing means for controlling operations of the respective means. The storage means includes a standard object database pre-storing object start identifiers each identifying the start of an object and object end identifiers each identifying the end of an object in display control information of a Web page provided by the information providing system, the object start identifiers and the object end identifiers being associated with each other. The storage means also includes a Web page identifier extracting condition database pre-storing the object start identifiers, the object end identifiers, and extracted portion identifiers each being associated with a combination of the object start and end identifiers and identifying a portion from which a Web page identifier is to be extracted. The processing means accepts a Web page identifier to identify a Web page provided by the information providing system from the input means. Then, the processing means receives display control information of the Web page corresponding to the accepted Web page identifier from the information providing system via the communication means and stores the display control information in the storage means. Then, the processing means takes the display control information of the Web page from the storage means and takes an object start identifier, an object end identifier, and an extracted portion identifier associated with a combination of the object start and end identifiers with reference to the Web page identifier extracting condition database. Then, the processing means specifies a portion sandwiched by the taken object start identifier and object end identifier from the taken display control information and extracts a Web page identifier of a linked Web page from the specified portion based on the taken extracted portion identifier. Then, the processing means receives display control information of the Web page corresponding to the extracted Web page identifier from the information providing system via the communication means and stores the display control information in the storage means. Then, the processing means takes an object start identifier and an object end identifier associated with the object start identifier with reference to the standard object database. Then, the processing means extracts a portion as an object sandwiched by the taken object start identifier and object end identifier from the display control information stored in the storage means, and stores the portion in the storage means.

Here, the object is part of the display control information of a Web page and is a minimum unit constituting a substance displayed on the Web. page. Examples of the object include a figure object represented by an <img> tag, a table object represented by a <table> tag, and a text object represented by an <a> tag and having a hyperlink.

The invention described in Claim 2 is an object cutter program used in a terminal apparatus including information storage means, information input means, communication means for communicating with an information providing system, and processing means for controlling operations of the respective means. The storage means includes a standard object database pre-storing object start identifiers each identifying the start of an object and object end identifiers each identifying the end of an object in display control information of a Web page provided by the information providing system, the object start identifiers and the object end identifiers being associated with each other. The storage means also includes a Web page identifier extracting condition database pre-storing the object start identifiers, the object end identifiers, and extracted portion identifiers each being associated with a combination of the object start and end identifiers and identifying a portion from which a Web page identifier is to be extracted. The processing means accepts a Web page identifier to identify a Web page provided by the information providing system and a search condition from the input means. Then, the processing means receives display control information of the Web page corresponding to the accepted Web page identifier from the information providing system via the communication means and stores the display control information in the storage means. Then, the processing means takes the display control information of the Web page from the storage means and takes an object start identifier, an object end identifier, and an extracted portion identifier associated with a combination of the object start and end identifiers with reference to the Web page identifier extracting condition database. Then, the processing means specifies a portion sandwiched by the taken object start identifier and object end identifier from the taken display control information and extracts a Web page identifier of a linked Web page from the specified portion based on the taken extracted portion identifier. Then, the processing means receives display control information of the Web page corresponding to the extracted Web page identifier from the information providing system via the communication means and stores the display control information in the storage means. Then, the processing means takes an object start identifier and an object end identifier associated with the object start identifier with reference to the standard object database. Then, the processing means extracts a portion as an object that is sandwiched by the taken object start identifier and object end identifier and that satisfies the accepted search condition from the display control information stored in the storage means, and stores the portion in the storage means.

Advantages

With the above-described configuration, the processing means extracts a Web page identifier of a linked Web page from the display control information of the Web page corresponding to the Web page identifier accepted from the input means and receives the display control information of the Web page corresponding to the extracted Web page identifier from the information providing system. Accordingly, a non-conventional excellent object cutter program capable of extracting objects from a predetermined Web page and linked Web pages led by hyperlinks of the Web page without inputting Web page identifiers corresponding to the linked Web pages can be provided.

BEST MODE FOR CARRYING OUT THE INVENTION

Hereinafter, an embodiment of the present invention is described with reference to the drawings.

FIG. 1 is a block diagram showing an entire configuration of a system according to this embodiment. A terminal apparatus 100 and Web servers 200 serving as information providing systems connect to the Internet 300. Each of the Web servers 200 transmits display control information, such as an HTML (Hyper Text Markup Language) file, to the terminal apparatus 100 based on a request from the terminal apparatus 100. The terminal apparatus 100 extracts objects, such as figures and tables, from the display control information received from the Web server 200. Here, the Web server 200 may connect to the Internet 300 so that a third party other than a user of the terminal apparatus 100 can provide content and the like. In this embodiment, the plurality of Web servers 200 connect to the Internet 300. These Web servers 200 have a typical configuration including processing means, storage means, and communication means.

FIG. 2 shows a configuration of a typical PC (personal computer) serving as the terminal apparatus 100 to which an object cutter program 110 of the present application is applied. A keyboard 106 and a mouse 107 serving as input means; a display 108 serving as display means; a CPU 102 serving as processing means; a RAM 103, a ROM 104, and an HDD (hard disk drive) 109 serving as storage means; and an NIC (network interface card) 105 serving as communication means connect to a bus 101. An I/F represents an interface between the bus 101 and various devices. The HDD 109 stores the object cutter program 110, a standard object database 111, a Web page identifier extracting condition database 112, and so on. The CPU 102 of the terminal apparatus 100 reads the object cutter program 110 stored in the HDD 109 to the RAM 103 and executes it, so as to provide a function of extracting an object from display control information received from the Web server 200 with reference to the standard object database 111. Also, the CPU 102 of the terminal apparatus 100 extracts a Web page identifier of a linked Web page from display control information received from the Web server 200 with reference to the Web page identifier extracting condition database 112.

FIG. 3 shows a structure of the standard object database 111 stored in the HDD 109 of the terminal apparatus 100. In this embodiment, object start identifiers and object end identifiers are pre-stored in the standard object database 111 while being associated with each other. Here, the object start identifier identifies the start of an object in display control information. The object end identifier identifies the end of an object in display control information. For example, when the object is a table, the object start identifier is "<table>" while the object end identifier is "</table>".

FIG. 4 shows a structure of the Web page identifier extracting condition database 112 stored in the HDD 109 of the terminal apparatus 100 In this embodiment, object start identifiers, object end identifiers, and extracted portion identifiers each associated with a combination of object start and end identifiers are pre-stored in the Web page identifier extracting condition database 112. Here, the object start identifiers and object end identifiers are the same as those stored in the standard object database 111. The extracted portion identifier specifies a portion to be extracted when a Web page identifier of a linked Web page is to be extracted from an object specified by an object start identifier and an object end identifier. For example, when the object start identifier, the object end identifier, and the extracted portion identifier are "<a>", "</a>", and "src=", respectively, the portion that is sandwiched by "<a>" and "</a>" and that is described immediately after "src=" in the display control information is the Web page identifier of the linked Web page.

Now, an operation of the terminal apparatus 100 according to this embodiment is described.

FIG. 5 is a flowchart showing a process performed by the CPU 102 of the terminal apparatus 100 by reading the object cutter program 110 to the RAM 103 and executing it.

First, the CPU 102 of the terminal apparatus 100 displays a screen used for inputting a URL (uniform resource locator) as a Web page identifier and one or more keywords as a search condition on the display 108 (S10). FIG. 6 shows an example of an input screen 600. The input screen 600 is provided with a URL input field 601 for inputting a URL of a Web page from which an object is to be extracted, a keyword input field 602 for inputting one or more keywords of the object to be extracted, and an OK button 603. On this screen, a user inputs a URL and one or more keywords to the URL input field 601 and the keyword input field 602, respectively, by using the keyboard 106.

Upon press of the OK button 603 by the mouse 107, the CPU 102 of the terminal apparatus 100 accepts the URL of a Web page input to the URL input field 601 and the keyword(s) input to the keyword input field 602 (S15).

Then, the CPU 102 of the terminal apparatus 100 transmits a request for obtaining the Web page to the Web server 200 based on the accepted URL of the Web page. The processing means of the Web server 200 transmits display control information of the requested Web page to the terminal apparatus 100 based on the received request for obtaining the Web page. FIG. 7 shows an example of an HTML file as the display control information received by the terminal apparatus 100. The HTML file 700 includes "<a href="http://xxx/sub-page1.htm">SUB-PAGE1</a>" 701, which is a text object having a hyperlink, and "<img src="picture1.gif">". 702, which is a figure object. The CPU 102 of the terminal apparatus 100 stores the received HTML file 700 as display control information in the HDD 109 (S20).

Then, the CPU 102 of the terminal apparatus 100 extracts the URL of a linked Web page from the HTML file 700 stored in the HDD 109 in the following manner.

The CPU 102 of the terminal apparatus 100 takes an object start identifier, an object end identifier, and an extracted portion identifier associated with a combination of the object start and end identifiers, with reference to the Web page identifier extracting condition database 112. Then, the CPU 102 of the terminal apparatus 100 extracts, from the HTML file 700 stored in the HDD 109, the portion that is sandwiched by the taken object start identifier and object end identifier and that is described immediately after the extracted portion identifier, as the URL of the linked Web page (S25).

For example, in the case of the HTML file 700 shown in FIG. 7, the CPU 102 of the terminal apparatus 100 extracts the URL of the linked Web page in the following manner. The CPU 102 of the terminal apparatus 100 takes "<a>" as the object start identifier, "</a>" as the object end identifier, and "src=" as the extracted portion identifier associated with a combination of the object start and end identifiers, with reference to the Web page identifier extracting condition database 112. Then, the CPU 102 of the terminal apparatus 100 extracts, from the HTML file 700 shown in FIG. 7, the portion that is sandwiched by "<a>" and "</a>" and that is described immediately after "src=": "http://xxx/sub-page1.htm", as the URL of the linked Web page.

Then, the CPU 102 of the terminal apparatus 100 transmits a request for obtaining the linked Web page to the Web server 200 based on the extracted URL. Then, the processing means of the Web server 200 transmits the HTML file of the requested Web page to the terminal apparatus 100 based on the received request for obtaining the linked Web page. FIG. 8 shows an example of the HTML file 800 of the linked Web page received by the terminal apparatus 100. The HTML file 800 includes "<img src="picture2.gif">", which is a figure object. Then, the CPU 102 of the terminal apparatus 100 stores the received HTML file 800 as display control information in the HDD 109 (S30).

Accordingly, the CPU 102 of the terminal apparatus 100 stores the HTML file 700 of the Web page corresponding to the URL input on the input screen 600 through the keyboard 106 and the HTML file 800 of the linked Web page led by a hyperlink of the Web page in the HDD 109. In this embodiment, the CPU 102 of the terminal apparatus 100 receives only the display control information of the Web page corresponding to the URL input through the keyboard 106 and the display control information of the linked Web page led by a hyperlink of the Web page from the Web server 200 and stores the information in the HDD 109. Alternatively, the CPU 102 may extract a Web page identifier of a Web page further led by a hyperlink of the linked Web page, receive display control information of the Web page corresponding to the Web page identifier from the Web server 200, and store the information in the HDD 109 in the above-described method.

Then, the CPU 102 of the terminal apparatus 100 takes an object start identifier and an object end identifier associated with the object start identifier with reference to the standard object database 111. Then, the CPU 102 of the terminal apparatus 100 extracts, from the HTML file stored in the HDD 109, the portion that is sandwiched by the taken object start identifier and object end identifier and that includes the keyword(s) input on the input screen 600 through the keyboard 106, as an object satisfying the search condition (S35). Then, the CPU 102 of the terminal apparatus 100 stores the extracted object in the storage means.

For example, when the keyword input to the keyword input field 602 on the input screen 600 is "gif", the CPU 102 of the terminal apparatus 100 extracts <img src="picture1.gif"> and <img src="picture2.gif"> as objects satisfying the search condition from the HTML files shown in FIG. 7 and B stored in the HDD 109 and stores the objects in the HDD 109. FIG. 9 shows an example of a state where the CPU 102 of the terminal apparatus 100 stores the objects satisfying the search condition in the HDD 109.

With the above-described process, when objects are to be extracted from display control information of a predetermined Web page and linked Web pages led by hyperlinks of the Web page, the objects can be extracted without inputting Web page identifiers corresponding to the linked Web pages.

The objects stored in the HDD 109 can be used in the following way.

The CPU 102 of the terminal apparatus 100 displays substances for display, such as a figure and a table, corresponding to the stored objects and buttons associated with the objects on the display 108. Upon press of one of the buttons by the mouse 107, the CPU 102 of the terminal apparatus 100 adds the object associated with the pressed button to the display control information of a new Web page, so that the new Web page can be generated.

BRIEF DESCRIPTION OF THE DRAWINGS

FIG. 3 shows a structure of a standard object database.

FIG. 4 shows a structure of a Web page identifier extracting condition database.

FIG. 8 shows an example of an HTML file (display control information) of a linked Web page.

FIG. 9 shows an example of objects satisfying a search condition.

Figure 1:
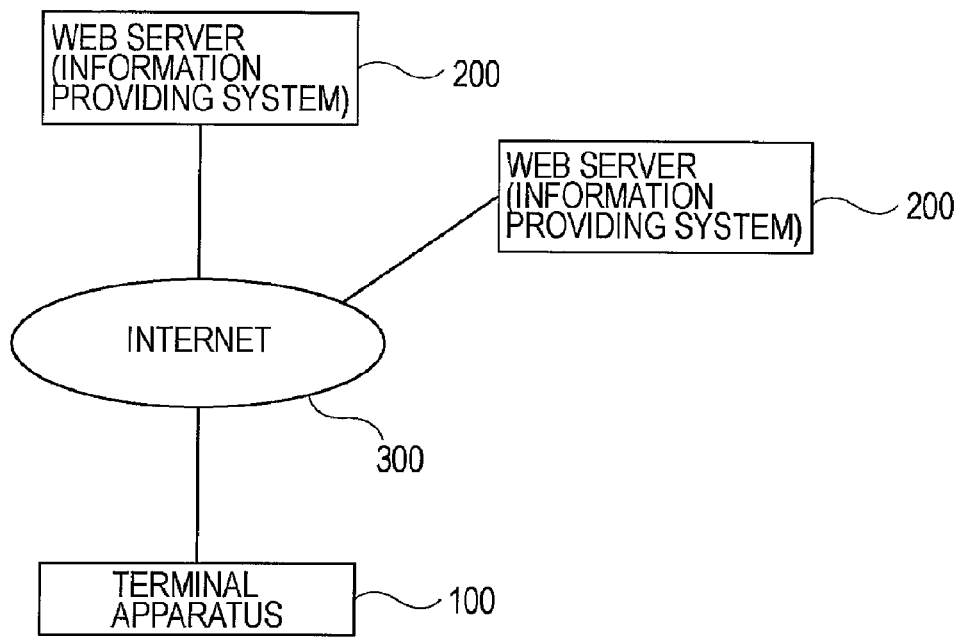
FIG. 1 is a block diagram showing an entire configuration of a system.
Figure 2:
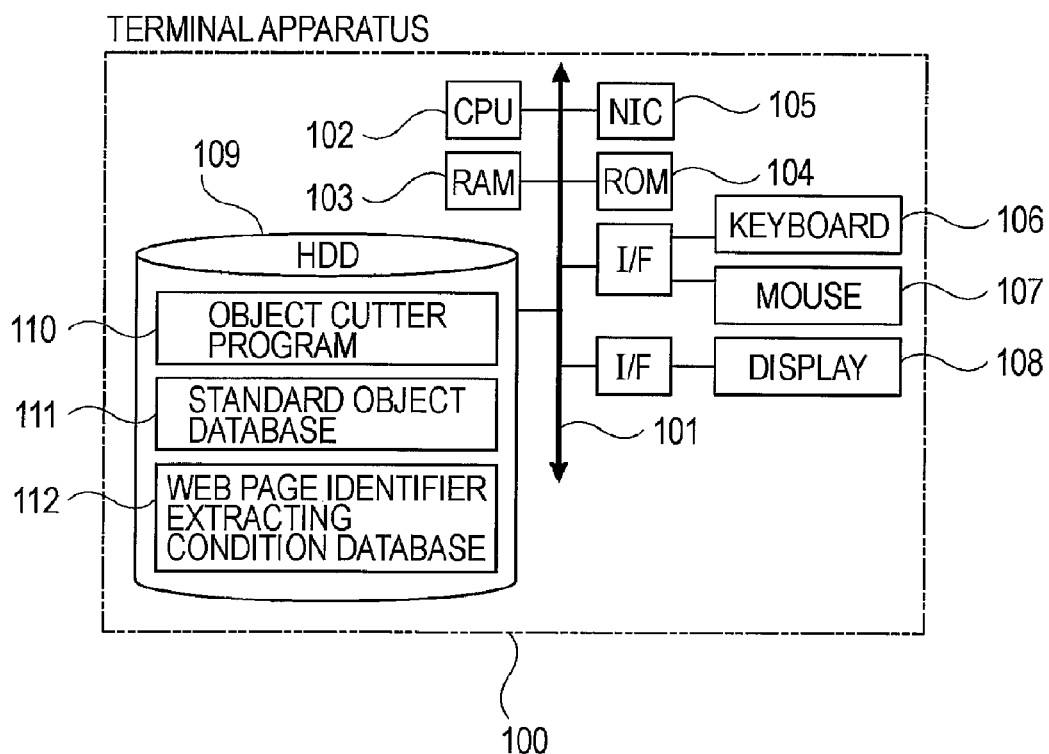
FIG. 2 is a block diagram showing a configuration of a terminal apparatus.
Figure 5:
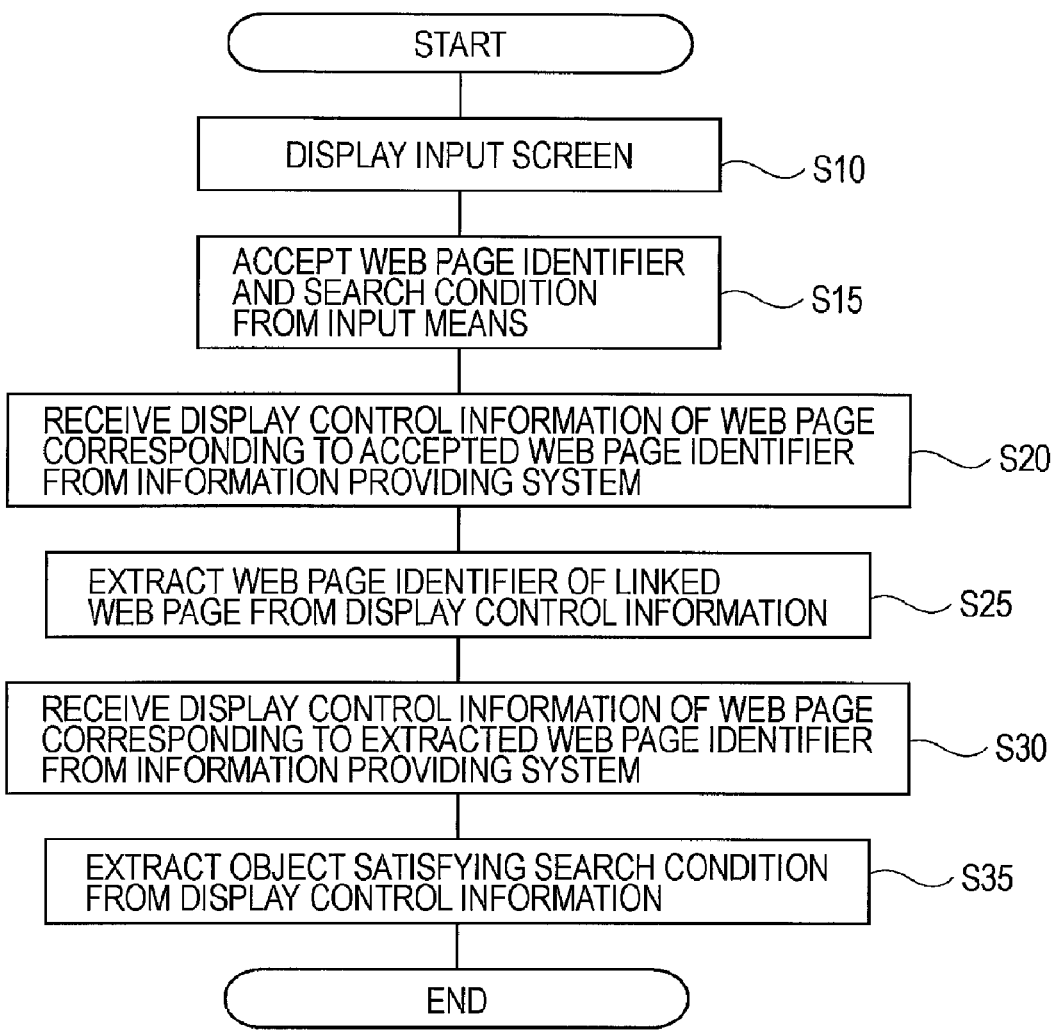
FIG. 5 is a flowchart showing a process in the terminal apparatus.
Figure 6:
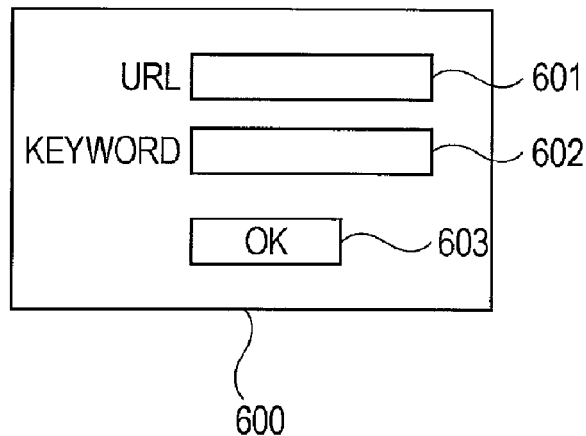
FIG. 6 shows an example of an input screen.
Figure 7:
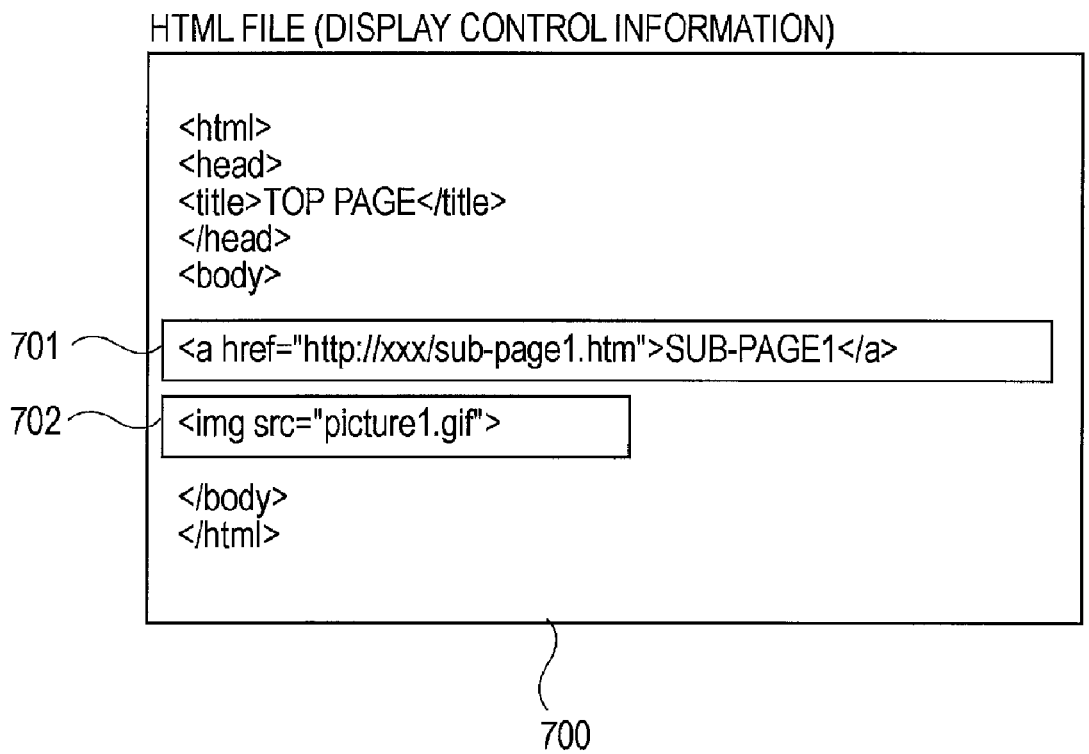
FIG. 7 shows an example of an HTML file (display control information).

The invention claimed is:

1. An information processing apparatus comprising:
an input device;
a processor; and
a memory device storing instructions which when executed by the processor, cause the processor to:
(a) enable a user to input a first Web page identifier which is used to identify a first Web page which is included in an information providing system, the Web page including first display control information;
(b) request and receive the first display control information based on the first Web page identifier;
(c) select an first object start identifier, a first object end identifier, and an extracted portion identifier;
(d) using the selected first object start identifier and the selected first object end identifier, specify a portion of the first display control information, the specified portion of the first display control information being sandwiched by the selected first object start identifier and the selected first object end identifier, the specified portion of the first display control information including a second Web page identifier which identifies a second Web page which includes second display control information;

(e) using the selected extracted portion identifier, extract the second Web page identifier;
(f) select a second object start identifier and a second object end identifier; and
(g) using the selected second object start identifier and the selected second object end identifier, extract:
  (i) from the first display control information, a first object sandwiched by the second object start identifier and second object end identifier; and
  (ii) from the second display control information, a second object sandwiched by the second object start identifier and second object end identifier.

2. The information processing apparatus of claim 1, wherein:
  (a) the first Web page identifier includes a first Uniform Resource Locator; and
  (b) the second Web page identifier includes a second Uniform Resource Locator.

3. The information processing apparatus of claim 1, wherein:
  (a) the first display control information includes a first HTML file; and
  (b) the second display control information includes a second HTML file.

4. An information processing apparatus comprising:
an input device;
a processor; and
a memory device storing instructions which when executed by the processor, cause the processor to:
  (a) enable a user to input:
    (i) a first Web page identifier which is used to identify a first Web page which is included in an information, providing system, the Web page including first display control information; and
    (ii) a search condition;
  (b) request and receive the first display control information based on the first Web page identifier;
  (c) select an first object start identifier, a first object end identifier, and an extracted portion identifier;
  (d) using the selected first object start identifier and the selected first object end identifier, specify a portion of the first display control information, the specified portion of the first display control information being sandwiched by the selected first object start identifier and the selected first object end identifier, the specified portion of the first display control information including a second Web page identifier which identifies a second Web page which includes second display control information;
  (e) using the selected extracted portion identifier, extract the second Web page identifier;
  (f) select a second object start identifier and a second object end identifier; and
  (g) using the selected second object start identifier and the selected second object end identifier, extract:
    (i) from the first display control information, a first object which is:
      (A) sandwiched by the second object start identifier and second object end identifier; and
      (B) satisfies the input search condition; and
    (ii) from the second display control information, a second object which is:
      (A) sandwiched by the second object start identifier and second object end identifier; and
      (B) satisfies the input search condition.

\* \* \* \* \*